J. P. DUNWALD.
VEGETABLE SLICER AND GRATER.
No. 191,322. Patented May 29, 1877.
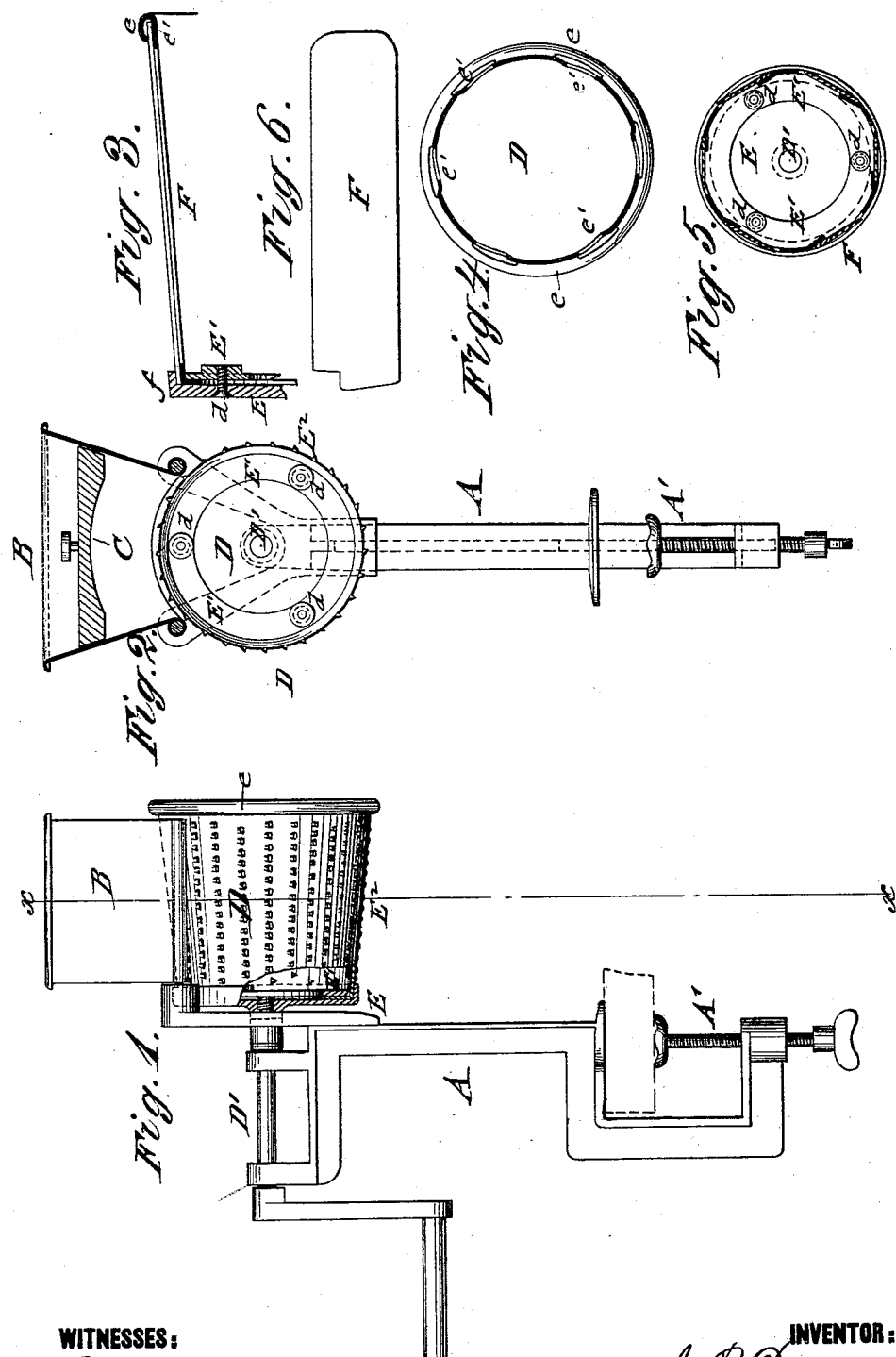

UNITED STATES PATENT OFFICE.

JOHN P. DUNWALD, OF NEW YORK, N. Y.

IMPROVEMENT IN VEGETABLE SLICER AND GRATER.

Specification forming part of Letters Patent No. 191,322, dated May 29, 1877; application filed January 19, 1877.

*To all whom it may concern:*

Be it known that I, JOHN P. DUNWALD, of the city, county, and State of New York, have invented a new and Improved Combined Vegetable Slicer and Grater, of which the following is a specification:

In the accompanying drawing, Figure 1 represents a side elevation of my improved vegetable slicer and grater, shown as a grater; Fig. 2, a vertical transverse section of the same on line $x\ x$, Fig. 1. Figs. 3, 4, and 5 are detail longitudinal and transverse sections of the revolving slicers, and Fig. 6 is a detail view of one of the slicing-knives.

Similar letters of reference indicate corresponding parts.

The invention relates to an improved slicer and grater for hotel, restaurant, and family use, by which potatoes, beets, radishes, and other vegetables may be sliced in rapid manner, and also horse-radish, nutmegs, and other articles grated with facility.

The invention consists of a feed hopper and follower arranged in connection with a horizontally-revolving tubular slicer or grater, composed of a detachable head, body, and interior clamping-ring plate.

In the drawing, A represents an upright standard that is clamped by a thumb-screw, A', in the usual manner to a table or other support.

The standard A carries at the upper part a hopper, B, of suitable size, with a weighted follower, C, that serves to press the vegetable or other article on the grater or slicer D, that is arranged immediately below the opening of the hopper C, and screwed by a center socket of the head-plate to the threaded end of a horizontal crank-shaft, D', turning in bearings $a$ of standard A. The slicer and grater D are interchangeable on the shaft, and made of tubular shape, either cylindrical or slightly conical, so as to throw the slices or gratings into a vessel placed below the open end of the slicer or grater.

The slicer or grater D is constructed of a head-plate, E, that is attached to the rimmed or flanged tubular body $E^2$, having either detachable knives or the usual rasp-cut surface by an interior ring, $E^1$, and set-screws $d$, as shown in detail in Figs. 2 and 5.

The knives F may be readily detached from the body $E^2$ for sharpening by unscrewing the head-plate from the shaft and loosening the ring-clamping screws $d$, being replaced by putting in the ring and tightening the screws. The detachable knives F are placed into seats or recesses $e'$ of the rim $e$ at the open end of the cylindrical body, and retained by the circumferential flange $f$ of the head-plate E binding on the opposite ends of the same. The vegetables to be sliced or grated are placed in the hopper and rest on the grater or slicer; the follower is placed thereon and pressed, if required, with one hand downward, the other hand turning the crank, so that the revolving slicer or grater acts on the vegetables, cutting off slices or gratings and discharging them through the open end of the slicer or grater into the receiving-dish below the same, producing thus the slicing and grating in rapid and convenient manner without injury to the fingers or other annoyance.

Having thus described my invention, I claim as new and desire to secure by Letters Patent—

1. The combination of the tubular slicer or grater D, having a rim or flange at one end, with a head-plate, E, and an interior clamping-ring attached by fastening-screws, substantially as specified.

2. The combination of the detachable knives F with the tubular body D, having outer rim with recessed knife-seats, and with the flanged head-plate binding on the opposite ends, substantially as shown and described, for the purpose specified.

JOHN P. DUNWALD.

Witnesses:
PAUL GOEPEL,
C. SEDGWICK.